United States Patent Office.

PASCAL MARINO, OF LONDON, ENGLAND.

PROCESS OF TREATING WOOD FOR USE IN SECONDARY BATTERIES.

1,023,948.  Specification of Letters Patent.  Patented Apr. 23, 1912.

No Drawing.  Application filed February 23, 1909.  Serial No. 479,649.

*To all whom it may concern:*

Be it known that I, PASCAL MARINO, a subject of the King of Italy, residing at London, England, have invented new and useful Improvements in Processes of Treating Wood for Use in Secondary Batteries, of which the following is a specification.

This invention relates to a new and useful process of treating wood for use in secondary or storage batteries, and it consists in bringing the wood into such a condition that it is freed from the extractive and fermentable substances and the soluble products of distillation, and is rendered porous to the electrolyte, and the gases given off by the electrolysis of the water.

In carrying out my invention, I employ thin veneers or thin sheets of wood, preferably white wood of a non-resinous nature. Natural wood, without having undergone any suitable chemical treatment to purify it, offers too great a resistance to the electric current and paralyses the electro-chemical working to the great detriment of its efficiency. For the purpose therefore of removing the impurities from the wood, so as to be able to advantageously utilize it in a secondary or storage battery, it is necessary to rid it successively from: 1, its fermentable extractive parts, and from the soluble products of distillation, and 2, the vasculose or incrusting matter. To remove these impurities, I first dissolve the fermentable extracts and soluble products of distillation by steaming the wood, and then get rid of the vasculose by means of a special oxidizer.

*First treatment.*—The wood sheets or boards after having been cut in the form and to the sizes suitable to constitute the separators of the electrodes, and, if necessary, provided on their surfaces with suitably spaced fillets or ribs, are then introduced into a closed vessel and subjected to the action of steam at a temperature of about 120° C. for about 15 minutes. The steam drives out the air and the gases in the liquefied vegetable tissue and removes from the wood those substances which form the base of the extracts susceptible to fermentation, as also all the elements of the products of distillation soluble in superheated steam, such as pyroligneous acid (acetic acid). Experiments have shown: (*a*.) That the fermentable extracts give rise either to an element which is the cause of deterioration of the wood in the acid electrolyte, or to an organic element which is the cause of reduction of the peroxid of lead on the positive electrodes. (*b*.) That acetic acid, in however small a quantity it may be present in each wooden separator, combines with the lead, and with the oxids of lead constituting the element, and produces acetate of lead which, in the presence of the sulfuric acid of the electrolyte, is converted into sulphate of lead. This sulphate adheres to the surfaces of the wooden separators and cannot be reduced into lead, nor peroxidized, owing to the wood being a non-conducting substance for the electric current; consequently, the porosity and permeability of the separators is diminished, the internal resistance of the accumulator increased appreciably, the phenomena of diffusion of the electrolyte meets with difficulties and obstacles, and a continuous and fresh supply of the electrolyte in intimate contact with the active material is hindered and made difficult. The superheated steam dissolves out a quantity of the bodies contained in the wood and allows of their being extracted wh''e facilitating the second treatment hereinafter described. When the first treatment is finished, the water of condensation of the steam, which is highly colored, is run off, and the wooden separators are removed.

*Second treatment.*—The solid tissue forming the skeleton of the wood may be classified into two principal parts: 1, the cellulose which forms the walls of the cells, and 2, the vasculose or, in other words, the incrusting matter which thickens these walls, without mentioning pectic substances which form a sort of inter-cellular cement, and are found, to some extent, in wood, but in larger proportions in textile fibers.

The chief characteristic which distinguishes the cellulose and the vasculose substance, is that the cellulose is dissolved by the ammoniacal solution of oxid of copper, (Schweitzer liquor), while the vasculose is in no way attacked by this reagent. On the other hand, all the oxidizers, hydrogen peroxid, ozone, nitric, chromic, and chloric acids, hypochlorites, permanganate of potassium, sulfurous acid, the sulfites, etc., oxidize the vasculose by forming with it resinous acids which are soluble in the alkalis and in alcohol.

The neutral solvents do not affect the vasculose. In the present process, of all the oxidizers for extracting the vasculose from the wood by oxidation in the form of soluble resinous acids, I prefer to employ hydrogen peroxid only. The reason for the restriction to hydrogen peroxid only is, that owing to the porous and absorbent qualities of the wood it would afterward be very difficult to completely expel and eliminate all traces of any of the oxidizers, such as nitric acid, chloric acid, chlorir hypochlorites, etc., and if any trace of any of these oxidizers was left in the wooden separators, it would have a most deleterious effect upon the working of the accumulator, and this the more so as the wooden separators go to form a very large portion of the elements of which my accumulator is constituted. This is, however, not the case with the harmless oxidizer which I have chosen, and that is why I particularly specify and employ it, namely, hydrogen peroxid only.

In order to effect the oxidation of the vasculose the separators are immersed in a bath of pure water to which has been added 20% of hydrogen peroxid. The separators are turned over so as to renew the surfaces of contact and so insure all parts of the separators being equally treated by the oxidizing liquid. At the end of about 3 hours the separators are withdrawn from the solution of hydrogen peroxid and then left impregnated therewith, for about 4 hours at the ordinary temperature. While thus exposed to the air, the following chemical reaction takes place, viz: The hydrogen peroxid decomposes and gradually gives up its oxygen to the vasculose, thus producing resinous acids. At the end of the 4 hours or thereabout, all the wood separators are again introduced into the vessel to be subjected, for say ten minutes, to steam at a temperature of about 110° C. They are then washed in strong ammoniacal cold water as to dissolve out the solutions of the resinous acids formed in the said wood separators and are then washed in clean water and dried (preferably by passing air, under pressure, through them) to prevent them cracking or splitting.

The oxidizers should not be in a concentrated and hot condition, as this would destroy the cellulose and deprive the separators of the ligneous cellulose walls which protect them. It is not essential that the vasculose be entirely removed from the solid tissue of the wood, as the wood is already sufficiently purified and porous to allow the free passage of the electric current, the escape of the gases and the diffusion of the electrolyte.

Having now described my invention, what I claim and desire to secure by Letters Patent, is:—

The method of rendering wood suitable for use as a separator in secondary batteries, the same consisting in treating the wood in the form of thin sheets or veneers, first with steam under pressure to free it from acetic acid then treating with hydrogen peroxid solution to oxidize the vasculose and finally extracting the oxidized products from the wood.

In witness whereof, I have hereunto signed my name in the presence of two subscribing witnesses.

PASCAL MARINO.

Witnesses:
H. D. JAMESON,
F. L. RAND.